Aug. 2, 1932.  A. B. MERRILL  1,869,607
GRAFTING AND BUDDING TAPE
Filed April 28, 1931
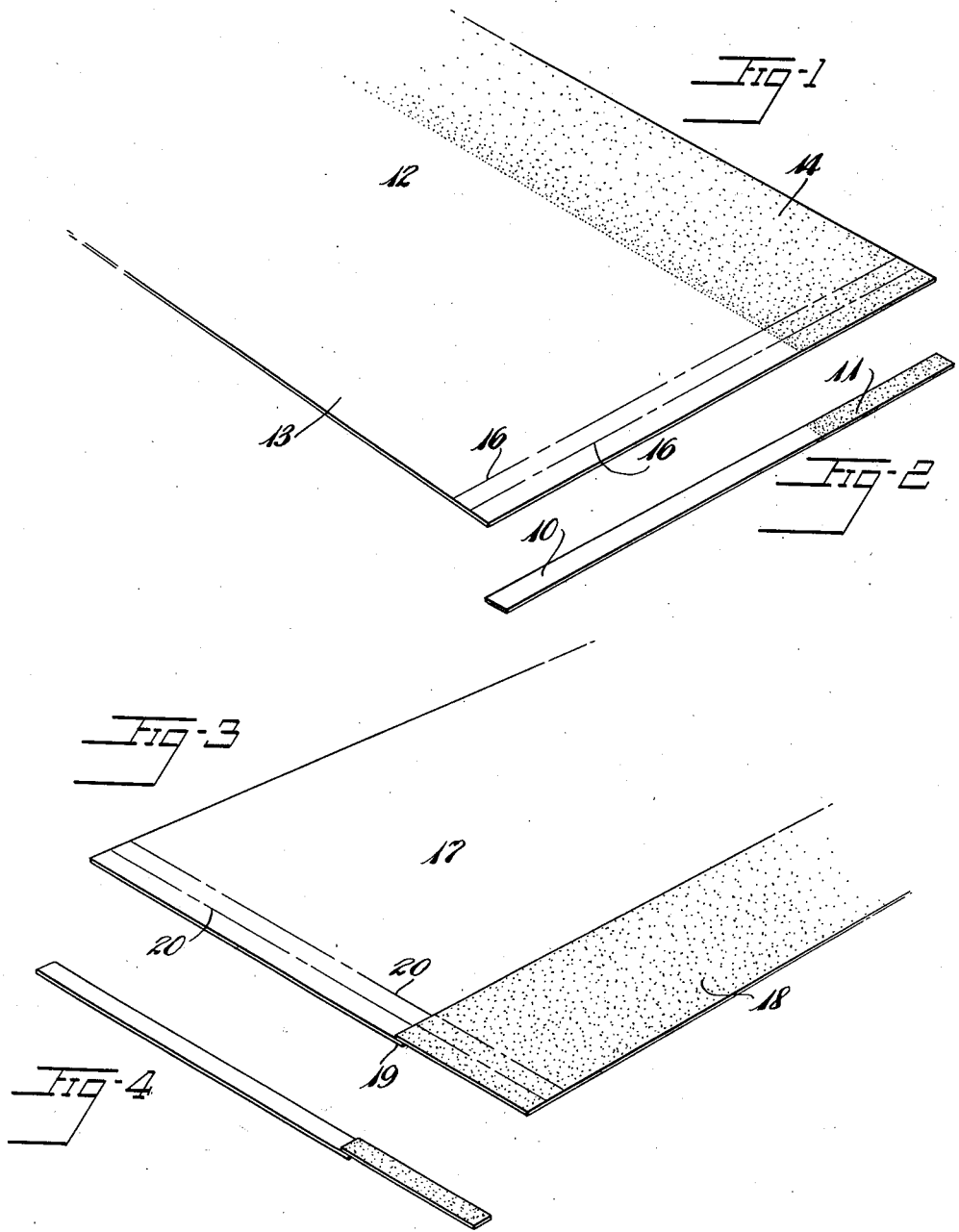
Inventor
Allan B. Merrill
By Eakin & Avery
Attys.

Patented Aug. 2, 1932

1,869,607

UNITED STATES PATENT OFFICE

ALLAN B. MERRILL, OF AKRON, OHIO, ASSIGNOR TO THE B. F. GOODRICH COMPANY, OF NEW YORK, N. Y., A CORPORATION OF NEW YORK

GRAFTING AND BUDDING TAPE

Application filed April 28, 1931. Serial No. 533,419.

My invention relates to grafting and budding tape to be used in holding the grafted parts in proper relation until union of the graft has occurred.

Heretofore it has been the practice to bind the parts of the graft in place by the use of raffia or other substantially inextensible material and to protect the graft from the weather by the application of grafting wax. Where such inextensible material was used it was necessary to remove the binding material within a given time to prevent injury to the plant.

My invention aims to provide a novel binding and sealing device which may be readily applied, will be efficient in protecting and holding the grafted parts, which will be extensible so as not to constrict the growth of the plant, which may be applied without tying, and which will be caused by eventual deterioration of its substance to relinquish completely its grip upon the tree.

My invention is illustrated in the accompanying drawing, in which Fig. 1 is a perspective view illustrating one method of manufacturing the tape of my invention.

Fig. 2 is a perspective view of a single tape made according to the method illustrated in Fig. 1.

Fig. 3 is a view similar to Fig. 1 showing another method of making the tape.

Fig. 4 is a perspective view of a single tape made according to the method illustrated in Fig. 3.

Referring to the drawing, the single tape illustrated in Fig. 2 comprises a narrow thin length of rubber compound vulcanized throughout the greater portion of its length, the vulcanized portion being indicated by the numeral 10 and unvulcanized throughout the remainder, the unvulcanized portion being indicated by the numeral 11.

In using this tape to bind a graft the vulcanized end is applied first and wrapped under tension around the juncture of the stock and scion, the leading end being held by the succeeding convolution of tape. In finishing the wrapping the unvulcanized end of the tape, being of an adhesive nature, will adhere to the convolutions previously applied without the use of cement and preferably is adhesively overlapped upon itself for still stronger adhesion. A single turn of the unvulcanized portion thus effectively prevents unwinding of the vulcanized portion, and the latter, preferably in a plurality of turns, provides a stronger constricting effect than a like structure of unvulcanized rubber.

In order to prepare the strips or tapes I calender or otherwise prepare a sheet of unvulcanized rubber 12 of width equal to the length of the finished tape. I then subject the greater portion 13 of the width thereof to vulcanization, leaving one marginal portion 14 unvulcanized. Vulcanization may be accomplished in various ways, a simple method being to apply with a brush or other implement a solution of sulphur chloride in a solvent of rubber such as benzine or carbon tetrachloride. Other methods of vulcanization may be used without departing from the invention.

The sheet of rubber material is then cut into strips crosswise as indicated at 16 to provide tapes like that illustrated in Fig. 2.

In the method illustrated in Fig. 3 two strips of rubber material 17 and 18 are separately prepared and joined edge to edge as at 19 to provide a sheet of proper width to form the tapes and by laterally extending successive cuts 20 is separated into tapes. The sheet 17 is made wider than the strip 18 and the strip 17 may be vulcanized before or after the two sheets have been united.

Where it is desired to unite the sheets after vulcanization the sheet 17 may have vulcanizing ingredients incorporated therein and the sheet 18 be formed from a non-vulcanizing compound. After the sheets have been adhesively united in edge to edge relation in that case, the entire sheet may be subjected to vulcanizing temperature or otherwise treated to cause vulcanization of the sheet 17 while the sheet 18 remains unvulcanized.

After the tape has been applied to a graft the action of sunlight and air will in time deteriorate the tape so that it will not be necessary to remove it. The expansibility of the tape will allow growth of the plant to take place without deforming the plant at the graft.

I claim:

1. A binding tape suitable for use in budding and grafting operations, said tape comprising a strip of rubber composition having a portion thereof vulcanized and a portion thereof unvulcanized.

2. A binding tape suitable for use in budding and grafting operations, said tape comprising a strip of rubber composition having a major portion thereof vulcanized and a minor end portion thereof unvulcanized.

3. A binding tape suitable for use in budding and grafting, comprising an elongated tape of rubber composition vulcanized throughout a portion of its length and unvulcanized throughout the remaining portion.

In witness whereof I have hereunto set my hand this 21st day of April, 1931.

ALLAN B. MERRILL.